UNITED STATES PATENT OFFICE 2,575,735

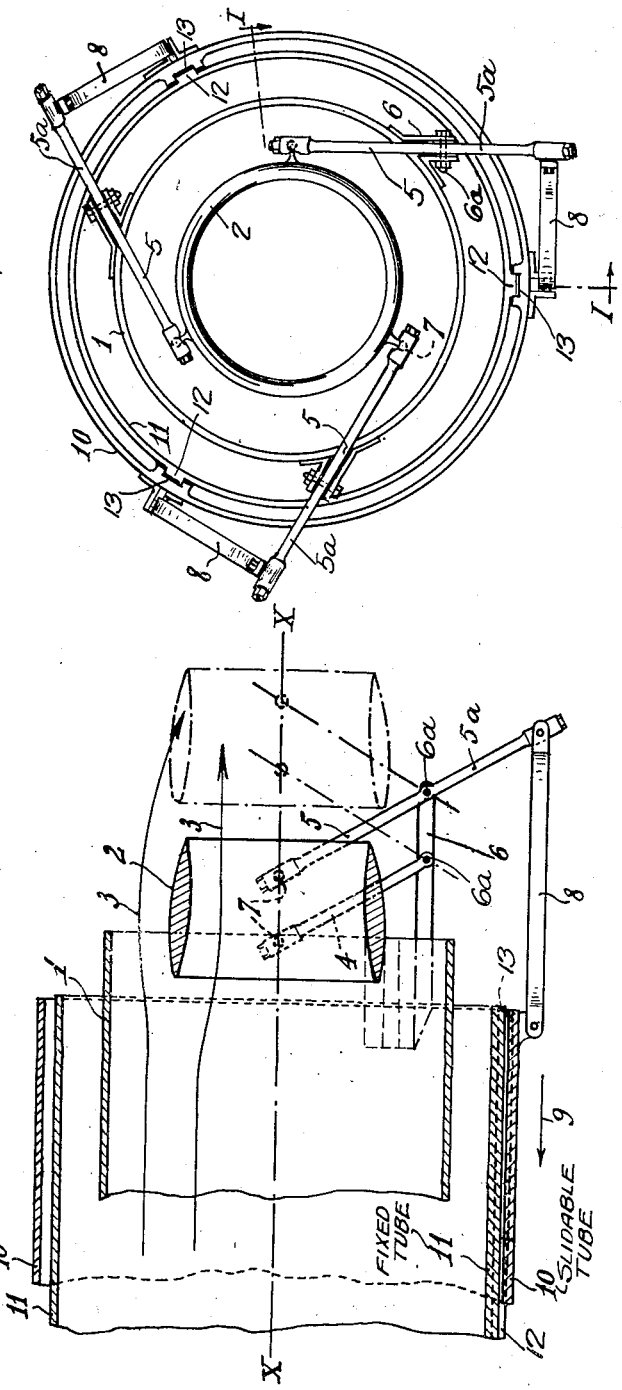

MEANS FOR ADJUSTING THE EFFECTIVE EXIT CROSS-SECTION OF A NOZZLE OR THE LIKE

Lucien Servanty, Paris, France, assignor to Societe Nationale De Constructions Aeronautiques Du Sud-Quest (Societe Anonyme), Paris, France, a company of France Application March 30, 1946, Serial No. 658,559
In France May 14, 1945

4 Claims. (Cl. 60—35.55)

It is an object of this invention to provide means for adjusting the effective exit cross-section of a nozzle or the like, particularly large nozzles as are arranged at the delivery end of jet propelled aircraft tuyères.

According to this invention, the nozzle or the like has an end revolution member, advantageously a cylindrical member, the inner cross section of which is at least equal to the maximum effective exit section to be provided, and said end member is combined with a co-axial ring which is axially movable and preferably has an aerofoil axial section.

The aerodynamic interference between the ring and nozzle varies according to the relative position thereof. The variation results in a correlative variation of the coefficient of contraction of the jet from said nozzle, and consequently a variation of effective exit cross-section.

With reference to the temperature of egressing gases, it is advantageous to control the axial movement of the ring without any movable guiding member located in the gas stream. For this purpose, in a preferred embodiment of this invention, a plurality of identical linked systems are provided around the ring. Said systems which are preferably interconnected, are operable from an outer control.

Thus with an apparatus which is simple, an adjustment of the exit nozzle is obtained and as the ring and nozzle surfaces do not contact in any position, any possible throttling of gases issuing from the nozzle is prevented.

Furthermore it is possible to apply the foregoing construction to nozzles adapted to deliver compressible gases at high speeds by so selecting the axial cross-section and dimension of the ring as to avoid production of compressional waves in the stream.

The following description with reference to the drawing given solely by way of example will show how this invention may be carried out.

Fig. 1 is a diagrammatic axial section of means in accordance with this invention, the section being taken along line I—I on Fig. 2.

Fig. 2 is a corresponding end view.

On the drawing, 1 denotes a cylindrical nozzle having its axis at X—X; co-axially movable therein is a ring 2. Said ring is shaped as a revolution body the axial section of which is an aerofoil section, e. g. a Joukowski section. The ring's outer aerofoil surface tapers axially inwardly in the direction of flow of gas being discharged from the nozzle, hence said outer aerofoil surface has a pressure reducing effect to deflect radially inwardly the discharge gases passing over said surface. As ring 2 is moved at the exit end of nozzle 1, the effective exit cross-section of the nozzle varies since aerodynamic interference takes place between the inner wall of the nozzle and the ring edges. Arrows 3 illustrate the deflection of two stream lines.

Ring 2 may be moved in nozzle 1 through any translation control means. According to the example illustrated in the showing, three similar and simultaneously operable linked parallelograms disposed in tangential relationship with ring 2 are used for this purpose. Each parallelogram comprises a pair of rods 4, 5 pivoted about pins 6a on supports 6 which, as viewed in Fig. 1, have their left ends suitably fixed rigidly to the exterior of the nozzle 1, with their right ends protruding axially substantially beyond the outer edge of the nozzle. It is to these protruding portions that the rods 4, 5 are pivoted. The inner ends of rods 4, 5 are pivotally connected with ring 2 through ball and socket joints 7 to facilitate axial movement of the ring as caused by the angular movement of the rods 4, 5 of the parallelograms while allowing for an amount of relative rotation of ring 2 about its axis caused by the arcuate movement of the socket joints 7.

In order to enable the controlling movement of ring 2 as described in the next preceding paragraph, at least one of the rods of each parallelogram, for instance rod 5, is extended outwardly into a part 5a connected with a link 8 movable according to arrow 9. With a view to having a more symmetrical device and uniform supporting reactions upon ring 2, it is advantageous to provide at least three such parallelograms and attach the links 8 related to each of said parallelograms to a sleeve 10 movable for adjustment purposes in co-axial relationship with nozzle 1. Sleeve 10 may be supported from a tube 11 which is heat-insulated from nozzle 1. The tube 11 which is arranged around the nozzle 1 coaxially thereto, carries on its outer periphery protruding ribs 12 (three as shown in the drawings) extending along generatrices of the tube and cooperating with grooves 13 extending along generatrices on the inner periphery of the sleeve 10 whereby the latter is capable of sliding along the tube 11 while remaining in every position coaxial to the nozzle 1.

It will be obvious that linked systems other than parallelograms may be used; also their number may be different from three. Again the control mechanism for said parallelograms may be different from the specific mechanism described.

While I have described and shown what I believe to be an efficient and reliable embodiment of my invention, it should be understood that alterations may be brought therein without departing from the spirit of the appended claims.

What I claim is:

1. The combination of a gas delivery nozzle having a discharge mouth which has a cylindrical gas-flow-directing inner surface extending for a substantial distance inwardly from the discharge end of the mouth, with a ring of axially-extending aerofoil shape in radial section and of materially less outer maximum diameter than the diameter of said mouth at said cylindrical inner surface; the said ring being supported adjacent said mouth in co-axial relationship with said cylindrical surface in such manner as to be capable of axial movement back and forth to plural positions in each of which the ring is wholly within the discharge path of a jet of gas being discharged from said mouth, and the said ring having a pressure-reducing aerofoil surface at its outer periphery which tapers inwardly in the direction of flow of said gas and which, in the presence of discharge-gas flow generally axially of said nozzle, diverts inwardly the discharge gas passing over said aerofoil surface to cross-sectionally contract the jet of gas being discharged from the nozzle.

2. The combination according to claim 1, the said ring being capable of such axial movement between one position in which it is wholly out of said discharge mouth and another position in which it is at least partly within said mouth.

3. The combination according to claim 1, further including means located outside said ring for supporting the same and means located outside said nozzle and connected to said former means for axially moving said ring.

4. The combination according to claim 3, the last named means including a part in ring formation about said nozzle, slidably supported for axial movement and an operative connection between said part and said supporting means for moving the latter and said ring as said part slides relatively to the nozzle.

LUCIEN SERVANTY.

REFERENCES CITED

The following references are of record in the file of this patent:

UNITED STATES PATENTS

| Number | Name | Date |
|---|---|---|
| 658,586 | Reiling | Sept. 25, 1900 |
| 719,849 | Oberwalder | Feb. 3, 1903 |
| 2,383,385 | Heintze | Aug. 21, 1945 |
| 2,408,099 | Sherman | Sept. 24, 1946 |
| 2,487,588 | Price | Nov. 8, 1949 |